(12) United States Patent
Achterholt

(10) Patent No.: US 6,476,712 B2
(45) Date of Patent: Nov. 5, 2002

(54) TIRE PRESSURE DISPLAY DEVICE

(75) Inventor: Rainer Achterholt, Kempten (DE)

(73) Assignee: Nolex AG, Moritz (CH)

( * ) Notice: Subject to any disclaimer, the term of this patent is extended or adjusted under 35 U.S.C. 154(b) by 0 days.

(21) Appl. No.: 09/813,809

(22) Filed: Mar. 22, 2001

(65) Prior Publication Data

US 2001/0050611 A1 Dec. 13, 2001

(30) Foreign Application Priority Data

Mar. 22, 2000 (DE) .......................................... 100 14 076

(51) Int. Cl.[7] .............................................. B60C 23/00
(52) U.S. Cl. ...................... 340/447; 340/445; 340/10.6; 340/870.28; 340/425.5; 73/146.5
(58) Field of Search .................................. 340/447, 442, 340/445, 446, 448, 425.5, 10.41, 426, 825.69, 825.72, 10.6, 5.72, 5.6, 5.61, 870.28, 10.1, 10.2, 10.3, 10.4; 73/146.5, 146, 146.1, 146.2, 146.3, 146.4; 701/24, 29, 30, 36

(56) References Cited

U.S. PATENT DOCUMENTS 5,500,637 A * 3/1996 Kokubu ....................... 340/447
6,259,362 B1 * 7/2001 Lin ............................. 340/457
6,294,989 B1 * 9/2001 Schofield et al. ........... 340/442

* cited by examiner

Primary Examiner—Anh V La
(74) Attorney, Agent, or Firm—Connolly Bove Lodge & Hutz, LLP; Larry J. Hume

(57) ABSTRACT

A tire pressure display device for a vehicle having several wheels provides each monitored tire with an electronic module including, for example, an integrated pressure sensor with measuring and control electronics which are coupled to a high-frequency transmitter/receiver. Away from the wheels, there is at least another high-frequency transmitter/receiver that is coupled to a microprocessor that exchanges high-frequency radiograms with each wheel's electronic module in an interrogation-response mode. In addition, a remote control locking arrangement activates a locking system on the vehicle. The triggering of a control command effectuated on the remote control locking arrangement also activates the microprocessor, which then initializes the electronic module for each monitored tire.

24 Claims, 1 Drawing Sheet

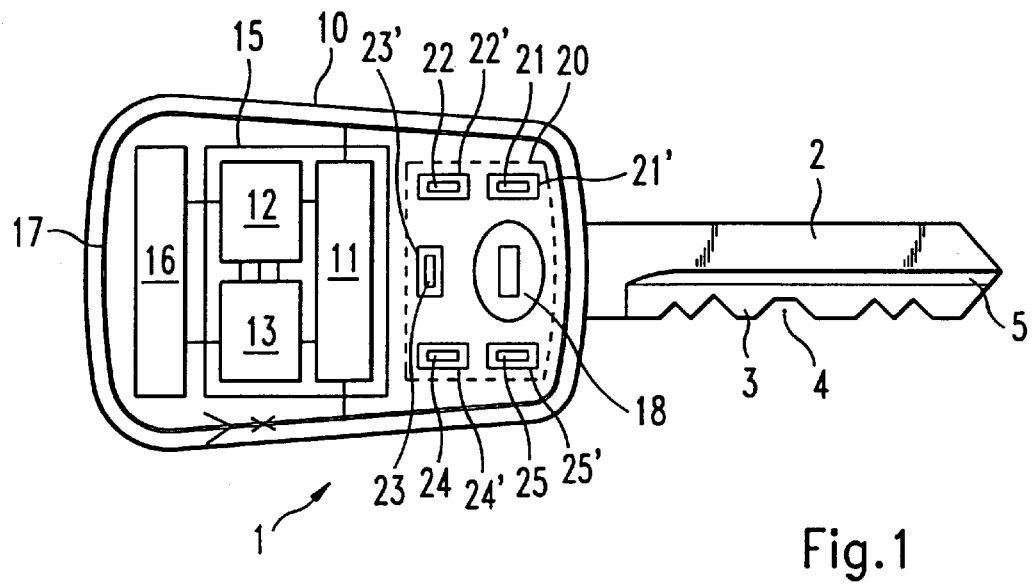
Fig.1
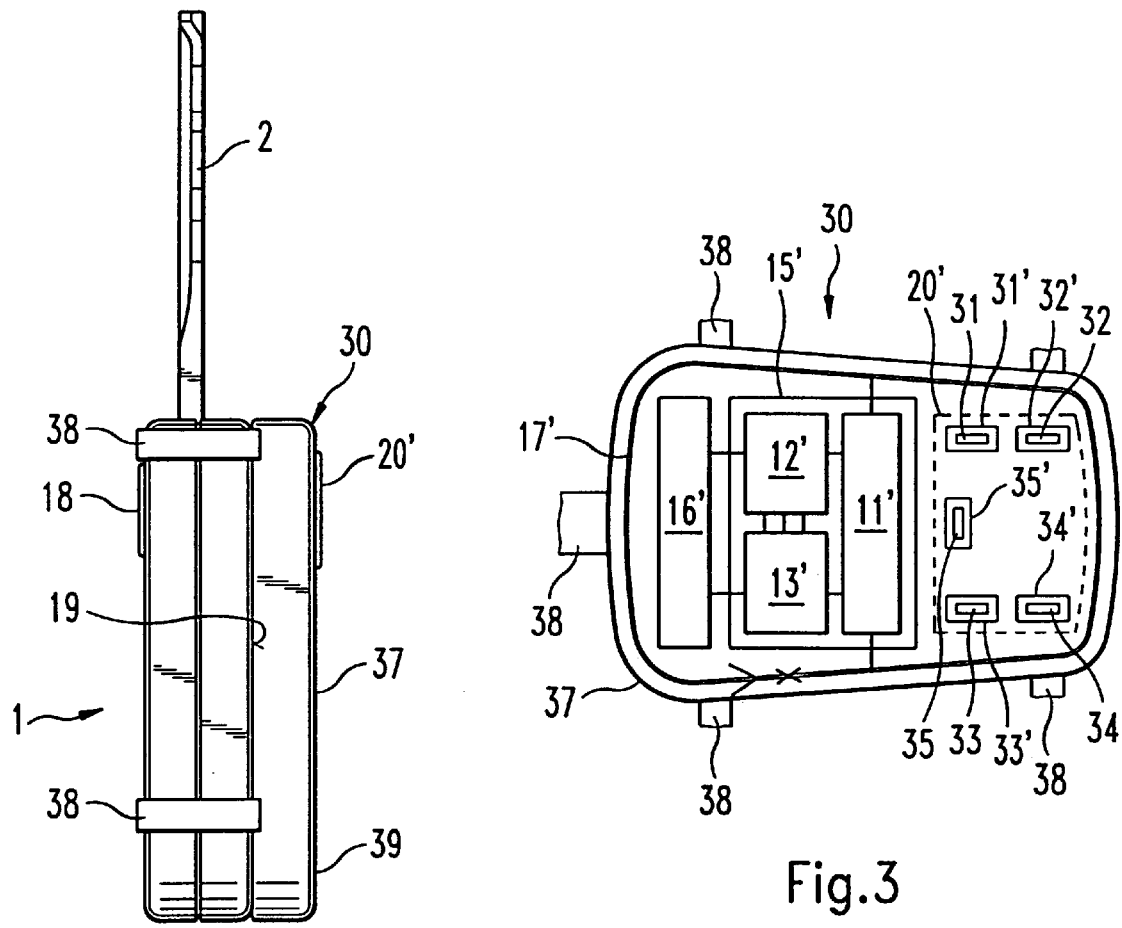
Fig.2
Fig.3

TIRE PRESSURE DISPLAY DEVICE

BACKGROUND OF THE INVENTION

1. Field of the Invention

The present invention relates to a tire pressure display device for a vehicle having several wheels, each of which is fitted with a pneumatic tire, whereby each monitored tire is provided with an electronic module having at least one integrated pressure sensor with measuring and control electronics, said sensor being coupled to a high-frequency transmitter/receiver means (in short: module means);

away from the wheels, there is at least another high-frequency transmitter/receiver means coupled to a microprocessor (in short: master means), which is configured for bi-directional high-frequency signal-data communication with each module means in the interrogation-response mode;

the tire pressure status of each monitored tire is displayed on one or more display element(s) of a display device that is actuated by display signals that have been generated by the microprocessor.

Furthermore, the invention relates to a vehicle remote control locking means intended for vehicles with such a tire pressure display device. Moreover, the invention relates to a method for the operation of such a tire pressure display device.

Within the scope of these documents, the designation

"module means" refers to a part of the electronic module on or in the pneumatic tire, namely, an integrated component with a pressure sensor (and optionally a temperature sensor) with measuring and control electronics, said sensor being coupled to a high-frequency transmitter/receiver means.

"master means" refers to a high-frequency transmitter/receiver means located away from the wheels and coupled to a microprocessor, whereby said means can exchange high-frequency radiograms with each module means in the interrogation-response mode.

2. Discussion of Background Art

A tire pressure display device of the above-mentioned type is known. Thus, for instance, U.S. Pat. No. 4,376,931 (Komatu et al.) discloses a system for detecting abnormalities in the internal air pressure of a tire, whereby each wheel is associated with a master means antenna that is located nearby in the wheel well. This antenna transmits at the natural frequency of a crystal resonator of the module means. Immediately after the end of the emission, the crystal resonator postoscillates and transmits a resonance frequency to the spatially associated antenna, which relays the received signal to the receiver of the master means. Depending on the configuration, an absence or presence of the resonator frequency serves as a sign of a pressure abnormality. If there are several wheels, the master means can interrogate the number of module means consecutively. In the case of twin tires, each module means can have a crystal resonator with a different natural frequency. However, in each case, the antennas of each module means and the antennas of the master means are coupled via a spatially adjacent arrangement, which ensures inductive coupling.

According to this known proposal, tire pressure monitoring can be carried out continuously in the moving vehicle. As an alternative, the air pressure can be checked only when the vehicle is started up.

This known tire pressure display device typically works at a natural frequency of the crystal resonators of 4 MHz.

U.S. Pat. No. 5,289,160 (Fiorletta) describes a comparable tire pressure monitoring system in which the signal between the master means and the module means is transmitted at a high-frequency (HF) in the range from 900 to 945 MHz. The carrier frequency can be modulated with a binary code that entails an identifying code for each module means. The association of a received radiogram with the "sending wheel" can be effectuated by this identifying code.

Experience has shown that the hard-wired transmission of the radiograms received at the vehicle's antennas to a central evaluation means calls for special (and expensive), shielded high-frequency cables. Retrofitting a vehicle with such high-frequency cables is complicated and expensive.

U.S. Pat. No. 5,463,374 (Mendez et al.) relates to a method and a device, which work together with each other to monitor the tire pressure and to receive the control commands from a remote control locking means ("electronic key"). The pressure in each tire is determined by a module means and telemetrically transmitted to a master means in the vehicle. According to this known proposal, only one-way communication between the module means and the master means is possible. The controller in a module means is activated, for example, when the value falls below or exceeds a prescribed pressure threshold limit, or else when an acceleration sensor detects a certain wheel rotational speed and thus a certain vehicle speed. However, it is not possible to activate the module means upon demand at a specific point in time, since said means does not have a receiver for high-frequency signals. The special feature lies in using the master means not only to receive and process the high-frequency signals from the module means but also to receive the signals from an electronic key in order to subsequently actuate the locking system on the vehicle, to open the trunk and/or to switch on the interior lighting. For this purpose, the same data formats and message formats are provided for the signals from the electronic key on the one hand and from the wheel modules on the other hand. However, this document does not recognize and propose feeding the display signals that have been generated by the master means to the electronic key and displaying them by means of display devices that are situated on the electronic key.

The document DE C2-41 33 993 discloses a comparable device for measuring and displaying the pressure in a pneumatic tire of a vehicle wheel. The master means can be located on the vehicle or on a special remote control element designed in the form of a hand-held device which, for purposes of determining and displaying the air pressure, is placed in the proximity of the tire whose air pressure is to be determined. Here, a wireless signal transmission via a signal transmission segment with a path length of about 50 cm to 200 cm is provided. The known remote control element is an additional component which has no other functions associated with it.

A comparable remote control element is known from the document EP 0 791 488 A1, which relates to a method and a system for measuring and adjusting the tire pressure. Ordinarily, when the tire pressure is checked at a gas station or other service station, the momentary tire pressure and the momentary tire temperature are measured; these measured values are related to a predefined setpoint tire pressure, and this generates a control command for the compressed air dispenser. According to the embodiment described in Claims 18, 19 and 20, each tire is provided with a module means that allows two-way communication to a remote control element—usually separate from the vehicle. At each tire, the momentary tire pressure and the momentary tire temperature can be measured using the individual module means, and corresponding high-frequency signals are telemetrically transmitted to the remote control element and displayed there by means of a display device. Using the tire pressure values displayed in this manner, the operator can properly operate the compressed air dispenser in order to correct the pressure in each tire. The known remote control element has no other functions; in particular, it is not designed to generate wirelessly transmittable signals for a remote control locking system in the vehicle.

From another area of the art, remote control locking means for vehicles are known which are configured, for example, in the form of an "electronic vehicle key" (see documents DE-A1-38 36 458 or DE-A1-43 08 372) or in the form of a chip card. Using such remotely controllable locking systems, a control command in the vehicle can be generated from a distance of several meters from the vehicle, in order to effectuate an unlocking or locking of at least one vehicle door lock or else a central locking system. Moreover, it is known to use the signal transmission from the remote control locking means to the vehicle to activate other functions on the vehicle such as, for example, deactivation or activation of a cut-off system (see the document DE-A1-196 43 759) or to effectuate an individual setting or adaptation of vehicle operating elements or subsystems to an individual driver (see the document DE-A1-197 53 086). Finally, two-way communication between the vehicle and the electronic key has also been proposed (see the document DE-A1-196 07 117) using an optical or acoustic display device on the key to display the locking status of the door(s), of the trunk lid and/or of the engine hood of the vehicle.

However, as far as the inventor knows, up until now, such an "electronic vehicle key" has not yet been used to display the tire pressure of the wheels of a vehicle. The document DE 197 24 099 A1 relates to a method to use blinking lights to signal an exact tire pressure of vehicles. It proposes that, before entering and/or leaving the vehicle, each blinking light generates a characteristic light signal for the tire pressure of the nearest wheel. The sending and/or interruption of the light signals can be brought about at will, for instance, by means of a remote control command transmitted wirelessly by a radio signal. This command can only serve to emit and/or to interrupt the light signals of the blinking lights, or it can also be used to signal the operating status of another aggregate, for example, of the central locking aggregate of the vehicle (see column 1, lines 50–59). This publication does not contain any information about how the tire pressure information is acquired and/or how the signals for actuating the blinking lights are generated. According to the disclosure of this publication, the blinking signals sent by the blinking lights are to visually indicate to the user whether the tire in question has an adequate pressure level. This precisely does not propose or suggest effectuating this tire pressure display by means of display devices that are situated on an electronic key located away from the vehicle.

SUMMARY OF THE INVENTION

The objective of the present invention is to create a tire pressure display device of the type described above (see U.S. Pat. No. 4,376,931) that is simpler and less expensive in terms of complexity and function.

Based on a tire pressure display device for a vehicle having several wheels which are each fitted with a pneumatic tire, whereby each monitored tire is provided with an electronic module having at least one integrated pressure sensor with measuring and control electronics, said sensor being coupled to a high-frequency transmitter/receiver means (in short: module means);

away from the wheels, there is at least another high-frequency transmitter/receiver means coupled to a microprocessor (in short: master device), which is configured for bi-directional high-frequency signal-data communication with each module means in the interrogation-response mode;

the tire pressure status of each monitored tire is displayed on one or more display play element(s) of a display device that is actuated by display signals that have been generated by the microprocessor, the solution of the objective described above is characterized in that additionally, a remote control locking means for activating a locking system on the vehicle is present;

an actuation of this remote control locking means for the wireless transmission of a control command to the vehicle for the activation of a locking system in the vehicle also activates the master means which then performs an interrogation of the module means according to such a sequence control that ensures that, at no point in time do response signals from several module means reach the master means at the same time or overlapping in time; and the display element(s) of the tire pressure status display device is/are situated on the remote control locking means or on an add-on device that is located on or adjacent to the remote control locking means.

DESCRIPTION OF PREFERRED EMBODIMENTS

According to the invention, the interrogation and display of the tire pressure are carried out while the vehicle is stationary each time before it is driven by actuating the remote control locking means to open at least one vehicle door. This is considered to be sufficient since the development of tires, rims and valves has reached such a high quality standard that the main cause of improper tire pressure is due to gradual pressure loss. In comparison to this, an additional and constant monitoring of the tire pressure on the moving vehicle would only negligibly increase the safety but it quite considerably increases the complexity and costs.

The management according to the invention for checking the tire pressure avoids the high-frequency communication between the master means and the module means that takes place at regular intervals. In particular, this increases the useful service life of the power supply source on the wheel. Moreover, a higher field strength can be provided for the few radiograms provided according to the invention. Furthermore, the invention avoids having a receiving antenna and, optionally, a receiver on each wheel well, which are then associated with the master means. There is no need for specially shielded high-frequency cables for connecting the antenna/receiver on each wheel well with a central evaluation device on the vehicle. Furthermore, a stable high-frequency radio connection to a module means is easier to generate on a stationary wheel than on a rotating wheel.

The system according to the invention for tire pressure checking is also very well-suited for retrofitting vehicles since there is no need for any substantial installation work and/or retooling of the vehicle itself.

Remote control locking means for vehicles, especially for automobiles, are already widespread. Thus, the invention does not call for an additional remote control element but rather turns to an already present remote control locking means in order to activate the master means.

According to an alternative, the generally known remote control locking means, for example, in the form of an "electronic key", is modified and additionally provided with the display element(s) of the tire pressure status display device.

According to another alternative, the known remote control locking means remains essentially unchanged. An external add-on device is merely added on, where at least the display element(s) of the tire pressure status display device is/are located. This add-on device can have the shape of a flat box or a flat disk and is mounted onto the remote control locking means, for example, glued or clamped onto it or permanently attached to it in another manner, or it is arranged in the immediate vicinity of said means. For example, the add-on device can be configured in the form of a key chain that is attached to a key ring or the like, which also holds the remote control locking means. This alternative allows an especially simple and inexpensive retrofitting since the known remote control locking means does not even have to be changed but rather, a simple, small add-on device merely has to be provided which contains the display element(s) of the tire pressure status display device.

After the master means has been activated, the interrogation of the module means (initialization) and the display of the tire pressure for all of the monitored tires take place autonomously for all of the monitored tires without there being a need to specifically approach the individual tires that are to be checked.

According to the invention, bi-directional high-frequency communication in the interrogation-response mode takes place between the master means and the module means. As the radiograms, modulated high-frequency data signals are typically provided that have carrier frequencies in the range of the ISM bandwidths (Industrial Scientific Medical Standard), that is to say, at about 433 MHz, or 869 MHz (in the United State 915 MHz) or at 2.4 GHz. The modulation, for example, ON/OFF modulation or amplitude modulation can be carried out by means of digital bit sequences. Typical radiograms comprise about 60 to 200 bits and contain at least one synchronization signal (about 8 to 60 bits), an address or code (usually 32 or 48 bits), the useful signal, here at least a pressure signal and optionally also a temperature signal (about 4 to 16 bits) and optionally a check digit. Sending a radiogram containing about 80 bits takes about 5 msec.

Through mutually coordinated, rapid frequency changes (frequency hopping), the security of the authentication and data transmission can be substantially increased. The field strengths are typically dimensioned for signal transmission distances of about 10 meters. A narrow spatial coupling between the transmitting antenna and the receiving antenna is no longer necessary.

The components and means for generating, transmitting and receiving such radiograms are known in the art and have been described in numerous patent publications. Typically, combined transmitting and receiving means (transceivers) are used, which are designed in the form of monolithic, integrated semiconductor components with a hybrid architecture. These transceivers can be provided on a shared printed circuit board together with other components such as, for example, a pressure sensor, temperature sensor, voltage and frequency stabilizer, circuits, memories, registers, logic elements and the like.

The electronic modules located in or on the tire can be attached, for example, to a tire valve as is described in documents DE-C2-39 30 479 or DE-C2-43 03 583.

Moreover, the electronic modules can be mounted on a valve cap that can be screwed onto the valve stem of a conventional tire valve of a pneumatic tire as described in the documents DE-C2-39 30 480 or DE-C2-43 03 591. Furthermore, these electronic modules can also be attached inside the pneumatic tire on the rim of a vehicle wheel as described in the documents EP-A2-0 816 137, EP-A2-0 925 958 or EP-A2-0 936 089. It is important that these electronic modules—upon demand by the master means generate a radiogram in the form of a high-frequency signal containing at least useful signals that indicate the most important momentary status quantities of the tire, that is to say, especially the tire pressure and optionally the tire temperature.

Advantageous embodiments and improvements of the invention ensue from the sub-ordinate claims.

The radiograms arriving at the master means are processed and evaluated there. The processing includes a demodulation, a decoding and preferably a comparison of codes with codes stored in a register of the microprocessor in order to identify the "sending wheel". When the useful signals are evaluated, display signals are formed which serve to actuate a display device. In the system envisaged here, a simple YES or NO statement is sufficient; for example, each monitored tire can have its own light emitting diode that is located on the electronic key or on the add-on device and that indicates a proper tire pressure status with a green light and an improper tire pressure status with a red light. In this case, the microprocessor has to select the applicable diode and provide the applicable tire pressure status. A sequence control deletes the light display after a certain period of time.

As an alternative, a digital display of actual, measured tire pressure values can be shown on each display element. In such a case, the display elements on the remote control locking means or on the add-on device are advantageously configured as liquid crystal displays.

The display device consisting of one or more display element(s) is located on the remote control locking means or on the add-on device. If the master means and the display device are spatially separated from each other, a wireless remote transmission of the display signals is effectuated from the master means located, for example, in/on the vehicle, to the display device located on the remote control locking means (=the electronic key) or on the add-on device.

In addition, the microprocessor of a master means in the vehicle can also feed the display signal via a bus or a diagnosis interface into the driver information system that provides the known symbol displays on the dashboard.

The master means can be integrated into the remote control locking means. In this case, preferably a uniform modified master means is provided that can carry out the function(s) of the remote control locking means such as interrogating the module means and evaluating its radiograms. All of the functions are carried out by one single part with integrated, complex components; this saves space and weight on the electronic key. In a known manner, this part is accommodated in a cavity formed in the head of the key. The implementation of the tire pressure display device according to the invention only calls for the provision of an electronic key modified in this manner and the attachment of an electronic module on or in each of the pneumatic tires.

If the display elements of the display device for displaying the tire pressure status are likewise and exclusively located on the electronic key, then a simple hard-wired signal transmission can be established between the microprocessor of the master means and these display elements.

If the remote control locking means is associated with an add-on device on which the display element(s) is/are located, then the master means can also be accommodated on or in this add-on device. In this case as well, the add-on device is a passive means and an activation of the master means accommodated on or in the add-on device is effectuated exclusively by actuating the pushbutton on the remote control locking means. Preferably, the master means accommodated in or on the add-on device detects such an actuation of the pushbutton in a contact-free manner, especially through capacitive, inductive or telemetric detection of the field change triggered by the pushbutton actuation in the immediate vicinity of the remote control locking means.

According to another alternative embodiment, the master means is permanently installed in the vehicle. The field strength of the radiograms can be adapted to the transmission in the vicinity of the vehicle. In this case, a conventional remote control locking means can be provided whose data signal not only activates the locking system of the vehicle but rather directly or indirectly also activates the master means on the vehicle. This embodiment is especially preferred when the transmitting/receiving antenna and/or the assembly of the master means, comprising the microprocessor and including the necessary control, memory, evaluation and actuation electronics are so voluminous that their accommodation on the electronic key would lead to an inconveniently large or heavy key. Even if the master means is on the vehicle, the display device is provided on the electronic key or on the add-on device, and the display signals are transmitted remotely and wirelessly. This embodiment is also advantageous when the data exchange between the remote control locking means and the vehicle is effectuated with ultrasound or infrared radiation; these media can also transmit the display signals.

According to another embodiment, it can be provided that the master means located on the vehicle is activated by the same control command that also unlocks at least one vehicle door lock. This control command is typically in the form of a hard-wired transmission to the locking system, and with the retrofitting provided according to the invention, this line can be wrapped in a sleeve that inductively or capacitively detects the occurrence of this control command and activates the master means accordingly.

It is known that familiar remote control locking means use extensive coding and decoding in order to ensure that a given remote control locking means actually only opens or locks the particular vehicle for which this remote control locking means is intended. This embodiment of the invention utilizes the coding and decoding that are present anyway. The transmission of the radiograms to the electronic modules only takes place after the vehicle on which the wheels are located and for whose electronic modules the radiograms are intended has been selected. In this case, the master means can advantageously be mounted on the vehicle in the area of the electronics that control the unlocking function on the vehicle.

Within the scope of the present invention, bi-directional high-frequency data communication takes place directly between the master means and the module means on the monitored wheels. The signal transmission distance is configured to be about 10 meters. For purposes of authentication, each data signal is preferably provided with an address or code, and each receiver has a corresponding memory and register by means of which a received signal can be identified and associated with a certain transmitting source.

Preferably, about 20 to 48 bits are reserved for the signal component that serves as the address or code. On the part of the manufacturer, it is sufficient if, during the serial production of the wheel modules, about 10 to 20 different codes are provided, and the finished wheel modules are marked accordingly. This can readily be achieved by the permutation of four different bit blocks. As an alternative, the manufacturer can provide each wheel module with a uniform, empty register whose register locations are assigned a digital "0" or "1" later during the mounting of a wheel onto the vehicle corresponding to the individual wheel position by interrupting or establishing certain conductor connections, by activating certain switching points of a keypad on the electronic module or by similar measures.

For the first-time assignment of the memory locations of a mobile master means associated with the various wheel positions (in an automobile, for example, front left, front right, back left, back right and optionally the spare tire) with the corresponding addresses/codes of the individual wheel modules, this mobile master means, which can be located on the remote control locking means or on the add-on device, can be brought into the immediate vicinity of the wheel in question. On the remote control locking means or on the add-on device, a pushbutton, corresponding to the wheel position to be stored, is actuated, which—at a reduced field strength—initializes a high-frequency signal data communication exclusively between the module means of this wheel and the master means. This data exchange occupies the memory location of the mobile master means that is reserved for a certain wheel position with the address/code of the module means of the particular wheel that is located in this wheel position. Using a confirmation signal, it is possible to indicate that the process of storing an address/code has been successfully completed. During a subsequent data exchange between the master means and a particular module means, on the part of the sender, the address stored there at the code position is incorporated into the data signal and, on the part of the receiver, it is checked whether a data signal address corresponds to the code stored in the module means. If this is the case, the pressure sensor at this module means is activated and a routine to generate and transmit a data signal containing the pressure signal is initiated. A sequence control present at the module means once again returns this module means to a resting state (sleep mode) after the data signal transmission has ended.

Although the mutual assignment via stored addresses and codes described above is fundamentally sufficient, additional measures can be provided to support the authentication and to promote the security of the high-frequency data transmission.

It is known that, during the short-range high-frequency signal transmission according to the Bluetooth standard, a rapid change in the frequencies and channels used for the signal transmission takes place, which is mutually coordinated between the transmitter and the receiver. Comparable measures can also be provided for the high-frequency signal transmission according to the invention between the master means and the module means.

Preferably, however, a transceiver having a receiving part with a follower amplifier is provided as the transmitting/receiving means in the master means as well as in the module means. This amplifier part comprises a SAW filter (Surface Acoustic Wave Filter), a first high-frequency amplifier, a second high-frequency amplifier and an intercept filter and a lowpass filter. The bias voltages of the amplifiers—independent of each other—are controlled by an impulse generator. Furthermore, the two amplifiers are coupled via a SAW delay line that generates a delay time, for example, of 0.5 $\mu$s. The two amplifiers are never switched to the ON position at the same time. As a result, an excellent reception stability is obtained. An amplification factor of more than 90 dB can be obtained. A transceiver with this type of receiver also allows an extremely fast switchover between the sleep mode and the operating mode as well as between transmitting and receiving, for instance, within a time span of about 20 to 200 μs. A suitable transceiver module (for 433.92 MHz) is sold, for example, by RF Monolithics, Inc. of Dallas, Tex. U.S.A. under the brand name DR3100. Another likewise suitable single chip very low power RF transceiver is sold by CHIPCON AS of Oslo, Norway under the brand name Smart RF CC 1000. Due to its low power consumption and high sensitivity, preference is given to this trasducer.

Within the scope of the present invention, a certain sequence control of the master means and of the module means is provided that ensures that at no point in time do response signals from several module means reach the master means at the same time or overlapping in time. This increases the security during the transmission, the assignment and the evaluation of the data signals. For this purpose, it can be provided that the master means interrogates a first moduleneans and waits for the arrival and processing of the response from this first module means at the master means before the master means interrogates a second module means in this interrogation cycle. Typically, a time span of just a few microseconds, in any case less than 0.1 second, elapses between the interrogation of one module means and the arrival of the response from this interrogated module means to the master means. In this manner, it can be reliably ensured that at no point in time do response signals from several module means reach the master means at the same time or overlapping in time, if the master means does not interrogate a second module means until at least 0.2 seconds, preferably 0.3 seconds, have passed since the interrogation of the first module means. The necessary time signals can be generated by means of an oscillating crystal clock or by means of a timer IC that is coupled to or integrated into the microprocessor of the master means.

Preferably, a sequence control can be provided that consecutively encompasses the following steps:

a) an actuation of a pushbutton on the remote control locking means in order to generate a control command for the vehicle locking system directly or indirectly activates the master means that is normally kept in the sleep mode;

b) after being activated, the master means generates and sends an interrogation signal that contains at least a synchronization bit sequence for all of the module means and an address for a selected module means as well as optionally a check digit. Moreover, the master means selects the display element corresponding to the address;

c) after sending the interrogation signal, the master means switches to the receiving mode;

d) the synchronization bit sequence of the interrogation signal activates all of the module means, which are normally kept in the sleep mode. At each module means, a routine is performed that checks whether the code stored in the register of the module means corresponds to the address of the interrogation signal. If this is not the case, then that particular module means is once again put into the sleep mode;

e) the particular module means that detects correspondence between the address and its code subsequently initiates a routine that measures the tire pressure, and generates and sends a response signal that, in addition to the synchronization bit sequence, contains a useful signal that corresponds to the measured tire pressure. Subsequently, this module means once again goes into the sleep mode;

f) the master means receives the response signal, evaluates its useful signal, generates a corresponding display signal and transmits this signal to the selected display element;

g) in each case, after 0.2 seconds, preferably after 0.3 seconds have elapsed, steps (b) through (f) are repeated for each additional wheel to be checked, whereby the address corresponding to the wheel to be checked is selected and incorporated into the interrogation signal;

h) after completion of the interrogation of all of the wheels to be checked, the master means goes into the sleep mode again;

i) after a given time period has elapsed, the tire pressure status generated by the display elements is deleted.

In addition to the steps which remain otherwise unchanged, a modified sequence control can encompass the following modified steps:

c') after sending the interrogation signal, the master means activates a register that contains a code corresponding to the address just sent, and then switches to the receiving mode;

e') the module means sends a response signal that, in addition to the synchronization bit sequence and the useful signal, also contains the code of the sending module means;

f') the master means receives the response signal, checks whether the code contained in the response signal corresponds to the code activated on the master means and, once it has ascertained the correspondence, carries out the further partial steps of step (f).

This modification yields an even greater security in the transmission and assignment of the data signals.

All of the above-mentioned steps (a) through (h) together can take place within a time span of less than 2 seconds, so that, immediately after a user actuates the pushbutton to trigger and remotely transmit the control command to open a vehicle door on the remote control locking means used for this purpose or on the connected or adjacent add-on device, the user receives an optical display of the tire pressure status for each monitored pneumatic tire of his/her vehicle.

BRIEF DESCRIPTION OF THE DRAWINGS

The figures serve to further explain the invention without limiting it; the following is shown:

FIG. 1 a schematic top view of an electronic key improved according to the invention;

FIG. 2 a side view of a conventional electronic key onto which an add-on device according to the invention has been mounted; and FIG. 3 a schematic top view of the add-on device according to FIG. 2.

FIG. 1 shows—on an enlarged scale—an example of an "electronic vehicle key" of a tire pressure display device according to the invention.

The "electronic vehicle key" 1 shown consists in a generally known manner of a metal key 2 and a head 10 onto which the key 2 is attached. The key 2 forms an elongated flat, blade-like element that is provided at least along one lengthwise side with teeth 3 and notches 4; in addition, a profile 5 in the lengthwise direction can be provided.

The likewise flat head 10 made of plastic typically consists of two halves that delineate a cavity. The electronics, a power supply source and optionally further components are accommodated in this cavity. The merely schematically indicated electronic components comprise a transceiver 11, a microprocessor (controller) 12 with an electronic memory and corresponding registers, a coding/decoding means 13 and the like, which are typically configured as a shared integrated component. All of these components together can form a master means 15. The power supply source 16 can be a battery with a high energy density, or a rechargeable accumulator or condenser that can be charged galvanically or in a contact-free manner via the ignition lock. The transceiver 11 is connected to a transmitting/receiving antenna 17. By means of a pushbutton 18, a control command can be triggered to activate a locking system on the vehicle, which also unlocks a vehicle door.

Moreover, on this electronic vehicle key 1, there is a display device 20 with which the tire pressure status of all of the monitored tires of the vehicle can be displayed. In the embodiment shown, this display device 20 has five display elements 21, 22, 23, 24, 25 that are associated with the various wheel positions (front left, front right, back left, back right and the spare tire). Each display element has a light emitting diode that can light up in different colors, for example, green or red. Each display element 21, 22, 23, 24, 25 is located on an adjustable pushbutton 21', 22', 23', 24', 25' whose actuation systematically and exclusively triggers an initialization for exchanging and storing addresses and codes between the master means and the particular module means located on the particular wheel with which the just-actuated pushbutton 21', 22', 23', 24' or 25' is associated.

FIG. 2 shows a conventional electronic vehicle key 1 that can be designed essentially corresponding to the key 1 according to FIG. 1, but that differs in that it is not provided with a display device 20. An add-on device 30 is attached to the back 19 of this key 1, facing away from the pushbutton 18. This add-on device 30 in this present example is a flat box 37 that is adapted to the contour of the key 1 and that is held in place on the key 1 by means of spring-mounted clamps 38. As can be seen in FIG. 3, a display device 20' for the optical display of the tire pressure status is formed on the front 39 of the add-on device 30 facing away from the key 1 and said display device 20' is provided with light emitting diodes 31, 32, 33, 34 and 35, which are associated with the various wheel positions. If desired, here too, each display element 31, 32, 33, 34 and 35 can be positioned on an adjustable pushbutton 31', 32', 33', 34', 35' whose actuation systematically and exclusively triggers an initialization for exchanging and storing addresses and codes between the master means located in/on the add-on device 30 and the particular module means located on the particular wheel with which the just-actuated pushbutton 31', 32', 33', 34' or 35' is associated. The electrical and electronic components 11', 12' and 13' for receiving the display signals and for actuating the display elements 31, 32, 33, 34 and 35 as well as a power supply source 16' and a receiving antenna 17' are all accommodated inside the box 37. If a master means 15' is also accommodated in the add-on device, then it is activated contact-free by actuating the pushbutton 18 on the electronic vehicle key 1.

What is claimed is:

1. A tire pressure display device for a vehicle having a plurality of wheels, each of said plurality of wheels having a tire thereon which is monitored by the device, the device comprising:

an electronic module associated with said tire and having at least one integrated pressure sensor with measuring and control electronics, said sensor being coupled to a high-frequency transmitter/receiver;

another high-frequency transmitter/receiver located apart from said plurality of wheels and coupled to a microprocessor configured for bi-directional high-frequency signal-data communication with each electronic module in an interrogation-response mode;

wherein a tire pressure status of each tire is displayed on at least one display element of a display device actuated by display signals generated by the microprocessor, a remote control locking means for activating a locking system on the vehicle;

wherein an actuation of the remote control locking means for a wireless transmission of a control command to the vehicle for activating the locking system in the vehicle also activates the microprocessor to cause an interrogation of the electronic module according to a sequence control that ensures that, at no point in time, do response signals from each of the electronic modules associated with a respective tire reach the microprocessor at a same or overlapping period in time;

wherein the at least one display element of the display device is situated on the remote control locking means or on an add-on device located on or adjacent to the remote control locking means.

2. The tire pressure display device according to claim 1, wherein the microprocessor is microprocessor installed in the vehicle.

3. The tire pressure display device according to claim 2, wherein the control command for activating the locking system is decoded on the vehicle;

wherein a decoded signal that is characteristic for the vehicle is received after the decoding, said decoded signal activating the locking system and the microprocessor.

4. The tire pressure display device according to claim 2, wherein the display signals are transmitted by at least one of ultrasound, infrared or high-frequency signals to the display device.

5. The tire pressure display device according to claim 1, wherein the microprocessor is integrated into the remote control locking means.

6. The tire pressure display device according to claim 1, wherein the microprocessor is accommodated on or in the add-on device; and an actuation of the remote control locking means also activates the microprocessor.

7. The tire pressure display device according to claim 1, wherein the microprocessor and the electronic module are each provided with a transceiver including a receiving part having a follower amplifier and which has two signal amplifiers independent of each other that are linked via a AW delay line, said signal amplifiers being controlled by an impulse generator in such a way that the two signal amplifiers are never switched into an ON position at the same time.

8. The tire pressure display device according to claim 1, wherein the microprocessor processes the sequence control to receive an actuation of a pushbutton on the remote control locking means to generate a control command for the vehicle locking system, and which activates the microprocessor that is normally kept in a sleep mode;

wherein, after being activated, the microprocessor generates and sends an interrogation signal that contains at least a synchronization bit sequence for all of the electronic modules, an address for a selected electronic module, wherein the microprocessor selects a display element corresponding to the address;

wherein, after sending the interrogation signal, the microprocessor switches to a receiving mode;

wherein, the synchronization bit sequence of the interrogation signal activates all of the electronic modules, which are normally kept in the sleep mode, wherein, at each module, a routine is run that checks whether a code stored in the register of the electronic module corresponds to the address of the interrogation signal and, if this is not the case, then a particular electronic module is put into the sleep mode;

wherein the particular electronic module that detects a correspondence between the address and the code initiates a routine that measures a tire pressure, and generates and sends a response signal that, in addition to the synchronization bit sequence, contains a useful signal having at least bits that correspond to the measured tire pressure, wherein the electronic module is placed into the sleep mode;

wherein the microprocessor receives the response signal, evaluates the useful signal, generates a corresponding display signal, and transmits the corresponding display signal to a selected display element;

wherein, in each case, after 0.2 seconds or 0.3 seconds have elapsed, the microprocessor interrogates each electronic module and measures a tire pressure for each additional tire to be checked, wherein an address corresponding to a particular tire to be checked is selected and incorporated into the interrogation signal, wherein, after completion of an interrogation of said each additional tire to be checked, the microprocessor is placed into the sleep mode; and wherein, after a given time period has elapsed, the tire pressure status generated by the display elements is deleted.

9. The tire pressure display device according to claim 1, wherein, after sending an interrogation signal, the microprocessor activates a register that contains a code corresponding to an address just sent, and then switches to a receiving mode;

wherein the electronic module sends a response signal that, in addition to a synchronization bit sequence and a useful signal, also contains a code of a sending electronic module; and wherein the microprocessor receives the response signal, checks whether a code contained in the response signal corresponds to a code activated in the microprocessor and, a correspondence has been determined, said microprocessor generates a corresponding display signal which is transmitted to a selected display element.

10. The tire pressure display device according to claim 8, wherein the microprocessor and the electronic module are each equipped with an electronic memory having a register and logic elements which store digital addresses and codes, and carry out routines in the sequence control.

11. A remote control locking means for a tire pressure display device according to claim 1, wherein the remote control locking means includes at least one display element which are actuated by display signals generated by the microprocessor.

12. The remote control locking means according to claim 11, wherein, for each monitored tire, an associated display element is present on the remote control locking means or an associated display element is present on the add-on device.

13. The remote control locking means according to claim 11, wherein each display element has one or more light omitting diodes that light up in different colors after appropriate actuation by the display signals in order to display a tire pressure status.

14. The remote control locking means according to claim 11, wherein each display element is located on an associated pushbutton wherein an actuation of said associated pushbuttons triggers an initialization for exchanging and storing addresses and codes between the microprocessor and electronic module located on the remote control locking means on the add-on device, wherein a particular electronic module is associated with a certain, just-actuated pushbutton.

15. The remote control locking means according to claim 11, wherein the microprocessor, which also generates a control command for activation of the locking system in the vehicle, is integrated into the remote control locking means.

16. The remote control locking means for a tire pressure display device according to claim 1, further comprising an add-on device located on or adjacent to the remote control locking means, wherein the add-on device includes at least one display element of the tire pressure status display device which is actuated by display signals generated by the microprocessor.

17. The remote control locking means according to claim 16, wherein the microprocessor is accommodated on or in the add-on device.

18. The device according to claim 8, wherein the interrogation signal generated by the microprocessor includes a check digit.

19. A method for the operation of a tire pressure display device intended for a vehicle with plural pneumatic tires having, associated with each monitored tire, an electronic module having at least one integrated pressure sensor with measuring and control electronics, said sensor being coupled to, a high-frequency transmitter/receiver; away from the wheels, at least another high-frequency transmitter/receiver coupled to a microprocessor which is configured for bi-directional high-frequency signal-data communication with each electronic module in interrogation-response mode; a display device with one or more display elements for displaying a tire pressure status of each monitored tire; a remote control locking system having a pushbutton to trigger a control command that activates a locking system of the vehicle, the method comprising:

actuating the pushbutton of the remote control locking system to activate the microprocessor and each electronic module;

controlling an initialization sequence of each electronic module according to a sequence control that ensures that, at no point in time, do response signals from different electronic modules reach the microprocessor at a same time or overlapping period of time; and displaying a tire pressure status thus obtained for each monitored tire on display elements situated on the remote control locking system or on an add-on device that is located on or adjacent to the remote control locking system.

20. The method according to claim 19, wherein said controlling an initialization sequence of each electronic module includes the following steps (a) trough (i):

a) actuating the pushbutton on the remote control locking system and generating a control command for the vehicle locking system to activate the microprocessor that is normally in a sleep mode;

b) generating, in the microprocessor after activation, an interrogation signal that contains at least a synchronization bit sequence for all of the electronic modules, an address for a selected electronic module, wherein the microprocessor selects a display element corresponding to the address;

c) switching, after generating the interrogation signal, the microprocessor to a receiving mode;

d) activating, by the synchronization bit sequence of the interrogation signal, all of the electronic modules, which are normally kept in the sleep mode, and checking whether a code stored in a register of the electronic module corresponds to the address in the interrogation signal and, if the code does not correspond to the address, placing the electronic module into the sleep mode;

e) initiating, in the electronic module when the code corresponds to the address, a routine that measures a tire pressure, and sending a response signal that, in addition to the synchronization bit sequence, contains a useful signal having at least bits that correspond to a measured tire pressure, and placing the electronic module into the sleep mode;

f) receiving the response signal, and the useful signal in the microprocessor, and transmitting a corresponding display signal to the selected display element;

g) repeating, after either 0.2 seconds or 0.3 seconds have elapsed, steps (b) through (f) for each additional tire to be checked, wherein an address corresponding to said each additional tire to be checked is selected and incorporated into the interrogation signal;

h) placing, after completion of the interrogation of all of said each additional tire to be checked, the microprocessor into the sleep mode; and i) after a given time period has elapsed, deleting the tire pressure status displayed by the display elements.

21. The method according to claim 19, wherein the controlling an initializing sequence, instead of the steps (c), (e) and (f), includes the following steps (c'), (e') and (f'):

c') after sending the interrogation signal, activating, by the microprocessor, a register that contains a code corresponding to an address just sent, and then switching to a receiving mode;

e') sending, by the electronic module, a response signal that, in addition to the synchronization bit sequence and the useful signal, also contains a code of a sending electronic module;

f') receiving, in the microprocessor, the response signal and checking whether a code contained in the response signal corresponds to a code activated in the microprocessor and, once a correspondence has been determined, transmitting the corresponding display signal to the selected display element.

22. The method according to claim 19 further comprising providing a routine for initialization of address and code exchange between the microprocessor and a selected electronic module;

wherein the remote control locking system contains an integrated microprocessor, or the add-on device provided with the microprocessor is brought into an immediate vicinity of a wheel associated with the selected electronic module;

wherein the routine is triggered on the remote control locking system or on the add device.

23. The method according to claim 22, wherein during the providing a routine step, a high-frequency data signal communication between the microprocessor and the selected electronic module is carried out at a reduced field strength, wherein a data exchange takes place exclusively between the microprocessor and the selected electronic module.

24. The method of claim 20, wherein the generating step includes generating the interrogation signal so as to include a check digit.

* * * * *